(12) United States Patent
Huang

(10) Patent No.: US 12,012,029 B2
(45) Date of Patent: Jun. 18, 2024

(54) DEBRIS HOPPER FOR A VEHICLE AND METHOD THEREOF

(71) Applicant: Federal Signal Corporation, Oak Brook, IL (US)

(72) Inventor: Xiaolun Huang, Naperville, IL (US)

(73) Assignee: Federal Signal Corporation, Oak Brook, IL (US)

(*) Notice: Subject to any disclaimer, the term of this patent is extended or adjusted under 35 U.S.C. 154(b) by 605 days.

(21) Appl. No.: 17/158,415

(22) Filed: Jan. 26, 2021

(65) Prior Publication Data

US 2021/0245648 A1 Aug. 12, 2021

Related U.S. Application Data

(60) Provisional application No. 62/975,319, filed on Feb. 12, 2020.

(51) Int. Cl.
*B60P 1/34* (2006.01)
*B60P 1/16* (2006.01)
*B60P 1/26* (2006.01)
*E01H 1/04* (2006.01)

(52) U.S. Cl.
CPC .................. *B60P 1/34* (2013.01); *B60P 1/16* (2013.01); *B60P 1/26* (2013.01); *E01H 1/047* (2013.01)

(58) Field of Classification Search
CPC .................. B60P 1/34; B60P 1/16; B60P 1/04
USPC ............... 298/17.5, 11, 17 R, 22 R, 22 P, 18
See application file for complete search history.

(56) References Cited

U.S. PATENT DOCUMENTS

| | | | |
|---|---|---|---|
| 3,162,877 A | 12/1964 | Schmidt et al. | |
| 3,293,679 A | 12/1966 | Murphy | |
| 3,552,659 A * | 1/1971 | Meyer | E01C 19/203 239/657 |
| 3,937,502 A * | 2/1976 | Gay | A01D 90/12 298/17.5 |
| 3,964,791 A | 6/1976 | Griffis | |
| 4,327,945 A | 5/1982 | Fowler | |
| 4,523,788 A * | 6/1985 | Prasad | A01D 43/0635 414/471 |
| 4,573,742 A | 3/1986 | Tegtmeier | |

(Continued)

FOREIGN PATENT DOCUMENTS

| | | |
|---|---|---|
| DE | 102016011278 A1 | 3/2018 |
| EP | 2055526 A1 | 5/2009 |

(Continued)

*Primary Examiner* — Hilary L Gutman
(74) *Attorney, Agent, or Firm* — Merchant & Gould P.C.

(57) ABSTRACT

A vehicle includes a frame and a debris hopper including a door disposed along a side of the vehicle. The vehicle also includes front and rear lift assemblies supporting the debris hopper on the frame and configured to lift and tilt the debris hopper relative to the frame. Each lift assembly includes a transverse support mounted across the frame. A lift arm including a first end and an opposite second end, with the first end of the lift arm pivotably coupled to one end of the transverse support. A leg extending below the debris hopper and disposed proximate the door, with the second end of the lift arm pivotably coupled to one end of the leg opposite of the debris hopper. A first fluid actuator extending between the transverse support and the lift arm, and a second fluid actuator extending between the lift arm and the leg.

22 Claims, 13 Drawing Sheets

(56) References Cited

U.S. PATENT DOCUMENTS

| | | | | |
|---|---|---|---|---|
| 4,883,321 | A * | 11/1989 | Voigt | B62D 53/062 298/17.7 |
| 5,060,334 | A | 10/1991 | Strauser et al. | |
| 5,064,248 | A | 11/1991 | Tegtmeier | |
| 5,193,882 | A * | 3/1993 | Gamaldi | B65F 3/24 414/553 |
| 5,234,312 | A | 8/1993 | Hirose | |
| 5,447,094 | A | 9/1995 | Geyler | |
| 5,797,203 | A * | 8/1998 | Vanderlinden | E01H 5/104 37/227 |
| 5,967,615 | A | 10/1999 | Rogers | |
| 6,371,565 | B1 * | 4/2002 | Libhart | B60P 1/34 15/83 |
| 6,439,667 | B1 | 8/2002 | Weets et al. | |
| 6,761,413 | B1 | 7/2004 | Mathews | |
| 6,832,883 | B2 * | 12/2004 | Pierce | B60P 1/6409 414/498 |
| 7,111,907 | B2 * | 9/2006 | Boon | B60P 1/26 298/18 |
| 7,185,953 | B1 * | 3/2007 | Young | E01H 1/047 298/24 |
| 8,060,978 | B2 | 11/2011 | Young et al. | |
| 8,087,731 | B1 | 1/2012 | Rogers | |
| 8,818,699 | B2 * | 8/2014 | Nichols | B62D 53/0871 298/17 R |
| 10,752,146 | B2 * | 8/2020 | Renger | B60P 1/165 |
| 2016/0167558 | A1 * | 6/2016 | Beiler | B60P 1/32 414/483 |
| 2019/0111825 | A1 | 4/2019 | Renger et al. | |
| 2020/0359559 | A1 * | 11/2020 | Koch | A01C 7/105 |
| 2021/0107389 | A1 * | 4/2021 | Beiler | B62D 59/04 |

FOREIGN PATENT DOCUMENTS

| | | |
|---|---|---|
| JP | 2004270160 A | 9/2004 |
| WO | 0069676 A1 | 11/2000 |
| WO | 2013124287 A1 | 8/2013 |

* cited by examiner

DEBRIS HOPPER FOR A VEHICLE AND METHOD THEREOF

CROSS REFERENCE TO RELATED APPLICATIONS

This application claims priority to U.S. Provisional Patent Application Ser. No. 62/975,319, filed Feb. 12, 2020 the disclosure of which is incorporated herein by reference in its entirety.

BACKGROUND

Street sweepers often include a hopper system that is used to collect and store debris during sweeping operations. The hopper system is also used to transport the collected debris to a receiving site and discharge the debris, for example, into a receiving container or a dump truck. During discharge operations, the dumping elevation can be varied from a ground level up to about 11-feet high, and a reach distance can be up to 2-feet away horizontally. Some known hopper systems have one or more hydraulically actuated lift arms that support a debris hopper. However, with side discharge sweepers (e.g., hopper systems that discharge debris along the side of the sweepers), when raising and lowering the lift arm, the debris hopper undesirably swings out and away from the sweeper. This swing out movement of the debris hopper reduces the effectiveness of side oriented discharge operations. Additionally, during discharge operations, the discharge hopper is required to be raised far above the receiving container during tipping so that the hopper does not make contact therewith.

Other known hopper systems use a scissor-type lift, however, these systems are heavy and cumbersome while occupying the space underneath the debris hopper so that other components have to move to other locations on the sweeper. Additionally, scissor-types lifts also includes many moving parts and pivot joints that increase manufacturing and maintenance costs. Moreover, during discharge operations, the debris hopper is required to laterally shift outwards prior to tipping, and this movement requires additionally movement mechanisms.

SUMMARY

In general terms, the present disclosure relates to high dump hopper systems for street sweepers. The hopper systems include a lifting and tilting mechanism, hydraulic fluid actuators and control, and a debris storage hopper with a discharge door. The hopper systems are compact, lightweight, and can be used in both mechanical and vacuum street sweepers. Additionally, the hopper systems can monitor hopper weight, self-level, and increase efficiency of tipping operations. Various aspects are described in this disclosure, which include, but are not limited to, the following aspects.

In one aspect, the technology relates to a vehicle including: an elongate frame extending between a front and a rear of the vehicle; a debris hopper including a door disposed along a side of the vehicle; and front and rear lift assemblies supporting the debris hopper on the elongate frame and configured to lift and tilt the debris hopper relative to the elongate frame, wherein each lift assembly includes: a transverse support mounted across the elongate frame; a lift arm including a first end and an opposite second end, wherein the first end of the lift arm is pivotably coupled to one end of the transverse support; a leg extending below the debris hopper and disposed proximate the door, wherein the second end of the lift arm is pivotably coupled to one end of the leg opposite of the debris hopper; a first fluid actuator extending between the transverse support and the lift arm; and a second fluid actuator extending between the lift arm and the leg.

In an example, the second fluid actuator is coupled to the leg at a pivot point, and the pivot point is disposed between one end of the leg that is coupled to the debris hopper and the other end of the leg that is coupled to the lift arm. In another example, a bracket is mounted to the lift arm between the first end and the second end, and both the first fluid actuator and the second fluid actuator are coupled to the bracket. In yet another example, the transverse support, the lift arm, the leg, the first fluid actuator, and the second fluid actuator are all aligned along a transverse plane and below the debris hopper. In still another example, at least one water tank is supported on the elongate frame and disposed between the front and rear lift assemblies. In an example, the first fluid actuator and the second fluid actuator are coupled together in flow communication.

In another example, a pressure sensor is coupled to the transverse support and is configured to monitor a pressure generated from the lift arm so as to determine a load weight held by the debris hopper. In yet another example, an angle sensor is configured to monitor a leveling angle of the debris hopper.

In another aspect, the technology relates to a vehicle including: an elongate frame extending between a front and a rear of the vehicle; at least one lift assembly coupled to the elongate frame; and a debris hopper supported by the at least one lift assembly and configured to lift and tilt relative to the elongate frame via the at least one lift assembly, wherein the debris hopper includes: a door rotatably coupled to the debris hopper and moveable between an open position and a closed position relative to the debris hopper; a latch plate pivotably mounted to the door and moveable between a locked position and an unlocked position; a fluid actuator coupled to the latch plate and configured to rotate the door; a lock pin coupled to the debris hopper, wherein in the locked position, the latch plate is engaged with the lock pin to prevent the door from rotating towards the open position, and wherein the latch plate is pivoted to the unlocked position via the fluid actuator prior to the door rotating towards the open position.

In an example, the fluid actuator is coupled between the latch plate and the debris hopper. In another example, a chute is rotatably coupled to the debris hopper and movable between an extended position and a retracted position, and the door is rotatably coupled to a top end of the debris hopper and the chute is rotatably coupled to a bottom end of the debris hoper. In yet another example, the fluid actuator is coupled between the latch plate and the chute. In still another example, prior to the latch plate pivoting towards the unlocked position, the fluid actuator moves the chute into the extended position. In an example, the chute is rotatably coupled to the debris hopper at a pivot point and the pivot point is offset from the fluid actuator coupling at the chute.

In another example, one or more stops are defined on the door that define the locked position and/or the unlocked position of the latch plate. In yet another example, the latch plate is configured to remain in the locked position without a force generated from the fluid actuator.

In another aspect, the technology relates to a method of lifting and tilting a debris hopper on a vehicle, wherein the vehicle includes a frame and at least one lift and tilt assembly supporting the debris hopper on the frame, the method including: lifting the debris hopper to a predetermined height via the at least one lift and tilt assembly, wherein the at least one lift and tilt assembly includes a lift arm having a first end pivotably coupled to the frame and a second end pivotably coupled to the debris hopper, a first fluid actuator coupled between the frame and the lift arm, and a second fluid actuator coupled between the lift arm and the debris hopper, and wherein during the lifting operation, the second fluid actuator maintains a horizontal level of the debris hopper; extending a chute from the debris hopper; tilting the debris hopper relative to the horizontal level, wherein during the tilting operation, the first fluid actuator synchronizes a height of the debris hopper to correspond to a position of the extended chute.

In an example, the method further includes logging the horizontal level of the debris hopper prior to the tilting operation so that after the tilting operation the debris hopper returns to the logged horizontal level. In another example, the method further includes switching a directional fluid valve between the first fluid actuator and the second fluid actuator to change between the lifting operation and the tilting operation. In yet another example, the method further includes monitoring debris weight within the debris hopper based at least partially on pressure from the lift arm or forces within the first fluid actuator and the second fluid actuator.

DETAILED DESCRIPTION

Figure 1:
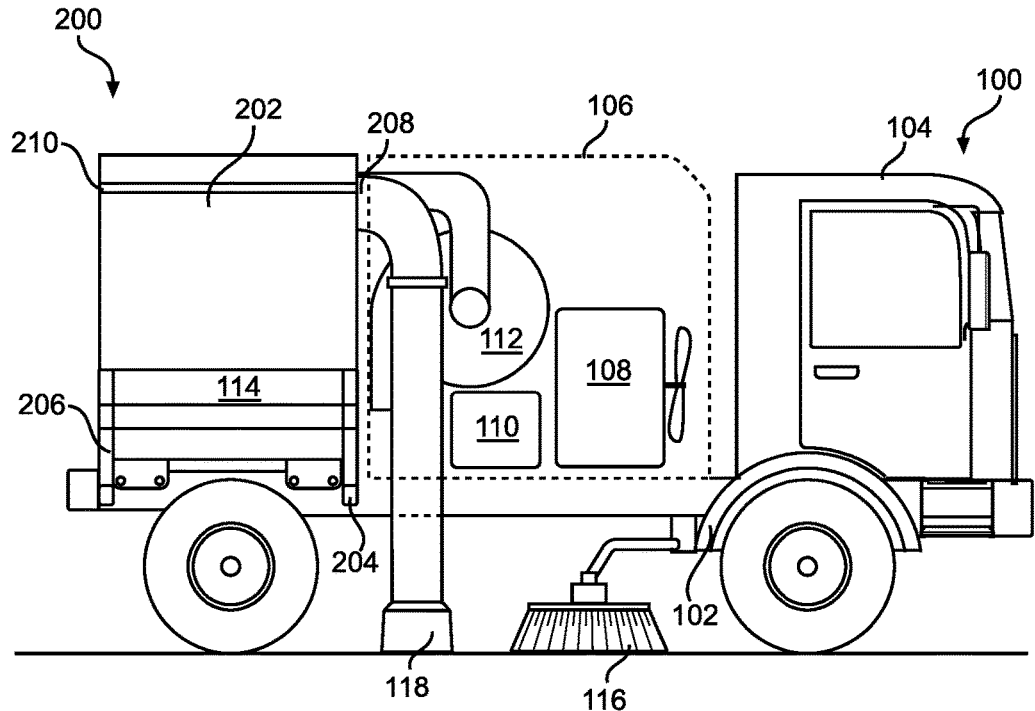
FIG. 1 is a side elevation view of an exemplary vacuum street sweeper.

Various embodiments will be described in detail with reference to the drawings, wherein like reference numerals represent like parts and assemblies throughout the several views.

This disclosure describes a high dump hopper system that can be used for both mechanical and vacuum types of street sweepers. The hopper system includes a lift and tilt mechanism with a pivotal single lift arm. Additionally, a leg portion extends from a debris hopper such that a pivot point with the lift arm is below the hopper floor. This configuration enables a shorter length lift arm to be used and results in reducing swing-out movement of the debris hopper when lifted, allowing for the lift and tilt mechanism to be stacked underneath the debris hopper and save space for other sweeper components, and decreasing weight while having less moving parts and being more energy efficient. The movement of the lift and tilt mechanism is driven by a pair of hydraulic actuators that are used to keep the debris hopper level and that synchronize lift and tilt movements, while reducing dumping spillage and conserving energy. Latch assemblies for locking a door of the debris hopper are also described herein and enable an automatic latch function.

FIG. 1 is a side elevation view of an exemplary vacuum street sweeper 100. The sweeper 100 is a vehicle having an elongate frame 102 and a cab chassis 104 disposed at the front of the vehicle. Behind the cab chassis 104, the sweeper 100 includes a compartment 106 that encloses an auxiliary engine and pump 108, hydraulic fluid tank 110, and a fan 112 that enable operation of the sweeper 100. Behind the compartment 106, the sweeper 100 includes a hopper system 200 mounted on the elongate frame 102. The hopper system 200 includes a debris hopper 202 supported on a front lift assembly 204 and a rear lift assembly 206. The front lift assembly 204 is disposed adjacent a front side wall 208 of the debris hopper 202 and the rear lift assembly 206 is disposed adjacent a rear side wall 210 of the debris hopper 202. The lift assemblies 204, 206 are configured to lift and tilt the debris hopper 202 relative to the elongate frame 102 and enable dumping operations from the side of the sweeper 100. The hopper system 200 is described in detail further below.

In the example, a water tank 114 is disposed at least partially underneath the debris hopper 202. In an aspect, the water tank 114 has a volume over 250 gallons. Because of the size of the water tank 114, it can be difficult to find a location for the water tank 114 on the sweeper 100. For example, the compartment 106 is full of other vehicle components, while placing the water tank 114 behind the rear wheel axle would negatively impact the weight distribution of the sweeper 100. As such, the hopper system 200 increases the configuration and performance of the sweeper 100.

Additionally, the sweeper 100 includes gutter brooms 116 and a pickup head 118. In the example, the lift assemblies 204, 206 are stacked under the debris hopper 202 so that the front and rear side walls 208, 210 are free from obstruction and can receive attachments from one or more vehicle components. For example, the debris hopper 202 can receive an inlet from the pickup head 118, an outlet to a dust separator or fan 112, a dust collection box from a separator (not shown), a wandering hose (not shown), etc.

Figure 2:
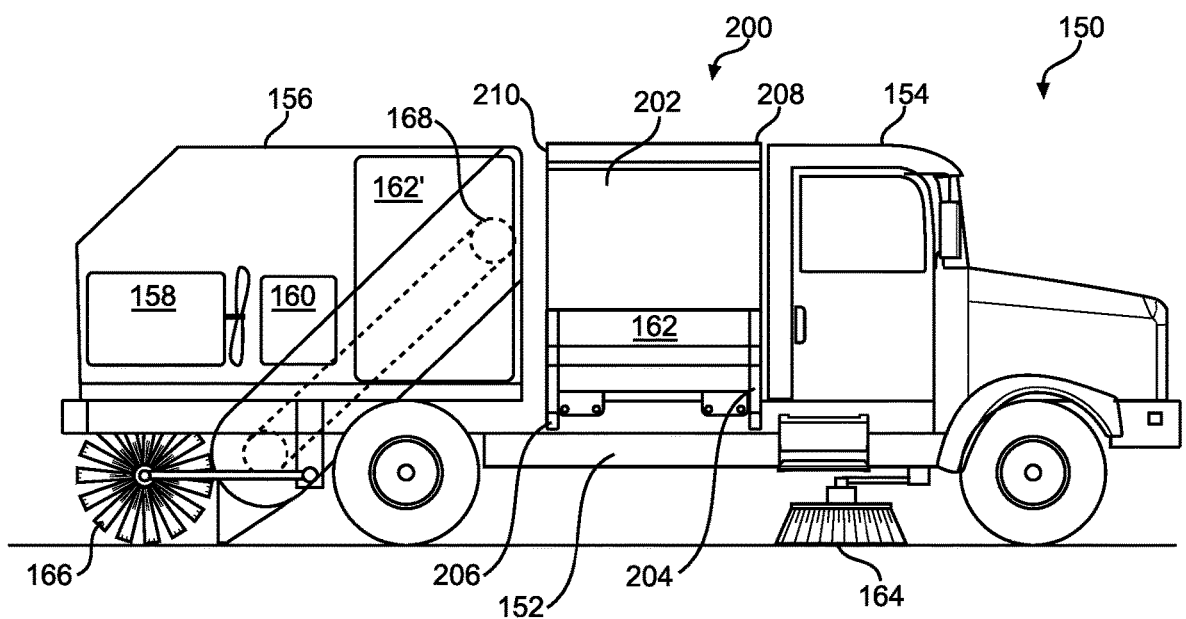
FIG. 2 is a side elevation view of an exemplary mechanical street sweeper.

FIG. 2 is a side elevation view of an exemplary mechanical street sweeper 150. Similar to the example described above, the sweeper 150 is a vehicle having an elongate frame 152 and a cab chassis 154 disposed at the front of the vehicle. In this example, the hopper system 200 is disposed behind the cab chassis 154 and mounted on the elongate frame 152. The hopper system 200 includes the debris hopper 202 supported on the front lift assembly 204 and the rear lift assembly 206. The front lift assembly 204 is disposed adjacent the front side wall 208 of the debris hopper 202 and the rear lift assembly 206 is disposed adjacent the rear side wall 210 of the debris hopper 202. The lift assemblies 204, 206 are configured to lift and tilt the debris hopper 202 relative to the elongate frame 152 and enable dumping operations from the side of the sweeper 150. The hopper system 200 is described in detail further below.

Behind the hopper system 200, the sweeper 150 includes a compartment 156 that encloses an auxiliary engine and pump 158 and a hydraulic fluid tank 160 that enable operation of the sweeper 150. In this example, the sweeper 150 includes a water tank 162 disposed at least partially underneath the debris hopper 202. Typically, a water tank 162' is disposed within the compartment 156, however, the hopper system 200 enables the water tank 162 to move out of the compartment 156 so that the center of gravity of the sweeper is improved in both longitudinal and vertical directions.

Additionally, the sweeper 150 includes gutter brooms 164 used to expand the sweeping pass width. Furthermore, a main broom 166 is provided to sweep debris on a road surface into a conveyor 168 that is then transferred into the debris hopper 202. In the example, the lift assemblies 204, 206 are stacked under the debris hopper 202 so that the front and rear side walls 208, 210 are free from obstruction and can receive attachments from one or more vehicle components.

Figure 3:
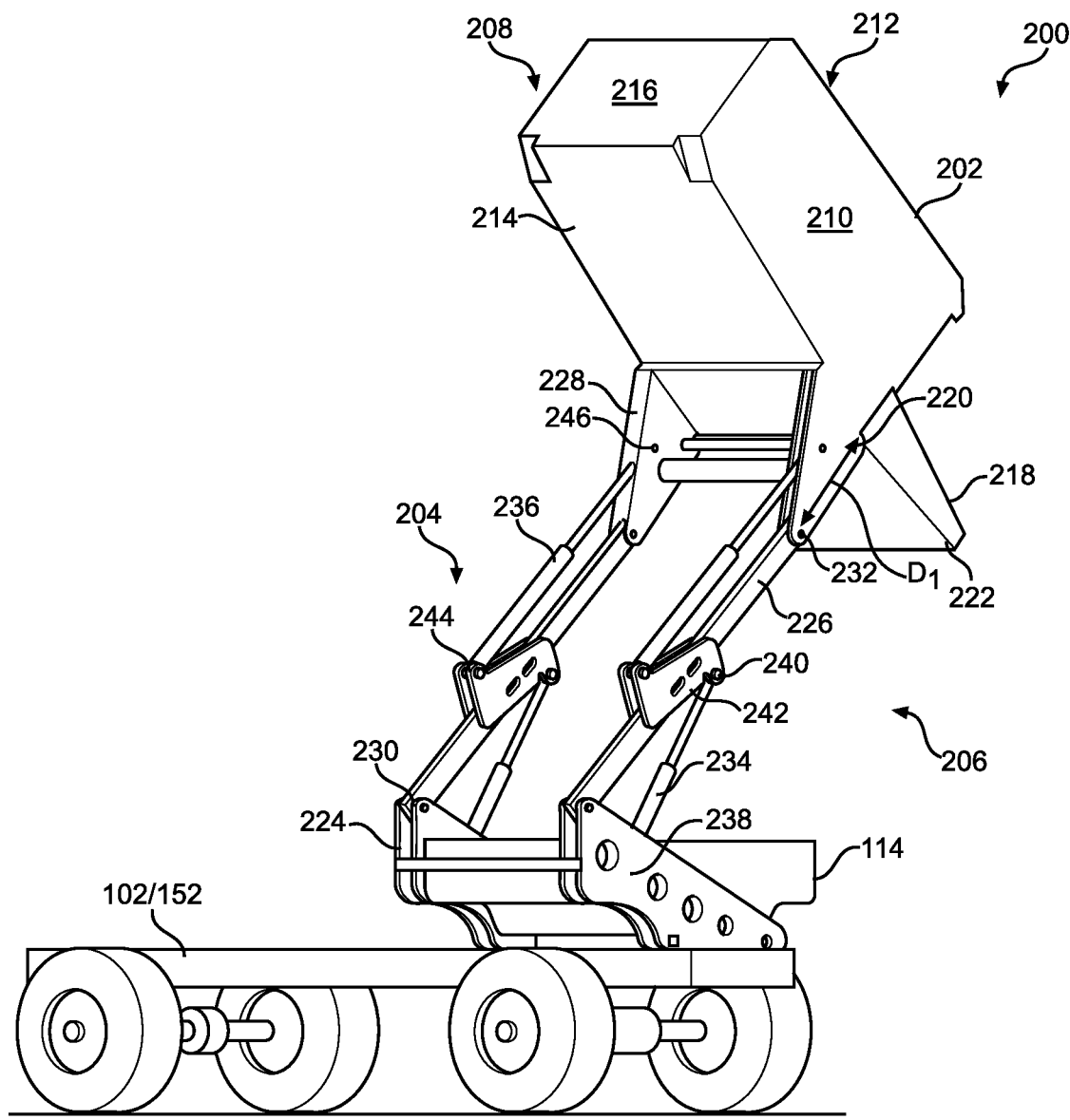
FIG. 3 is a perspective view of an exemplary hopper system of the sweepers shown in FIGS. 1 and 2.

FIG. 3 is a perspective view of the exemplary hopper system 200 of the sweepers 100, 150 (shown in FIGS. 1 and 2). As illustrated in FIG. 3, the elongate frame 102, 152 is shown, but the rest of the sweeper components have been removed for clarity. The hopper system 200 includes the debris hopper 202 that is configured to collect debris accumulated by the sweeper. The debris hopper 202 includes the front side wall 208, the rear side wall 210, a top wall 212, a bottom wall 214, and a side wall 216 so as to define a container for collecting and retaining debris. In the example, a door 218 is rotatably mounted to the front and rear side walls 208 and 210 proximate the bottom wall 214 of the debris hopper 202 at a pivot point 220. The door 218 is disposed along a side of the vehicle so that the hopper system 200 is a side dump system. The door 218 is movable between an open position (as illustrated in FIG. 3) and a closed position relative to the debris hopper 202. The movement of the door 218 enables the debris hopper 202 to open for dumping operations and allow for debris to be dumped off an extended edge 222 and in a direction towards a receiving container.

The front and rear lift assemblies 204, 206 support the debris hopper 202 on the vehicle frame and are configured to lift and tilt the debris hopper 202 during dumping operations. FIG. 3 illustrates the debris hopper 202 in a lifted (e.g., raised) and tilted configuration. In the example, each lift assembly 204, 206 has the same configuration and includes a transverse support 224 mounted across the elongate frame, a lift arm 226, and a leg 228 extending below the debris hopper 202. The lift arm 226 has a first end that is pivotably coupled to the transverse support 224 at a pivot point 230 and an opposite second end that is pivotably coupled to the leg 228 at a pivot point 232. The transverse support 224 and the leg 228 can be formed by a pair of spaced apart plates with the lift arm 226 disposed in-between so that the lift assembly can be folded and stacked underneath the hopper 202. The leg 228 is disposed on the same side of the debris hopper 202 as the door 218 and extends in an opposite direction. The pivot point 232 is on the other side of the leg 228 from the debris hopper 202 and spaced apart by a distance $D_1$. As such, the pivot point 232 is substantially below the bottom wall 214 of the debris hopper 202. The leg 228 is fixed to the debris hopper 202 and cantilevers therefrom. Similarly, the transverse support 224 is fixed to the frame and cantilevers therefrom. As described above, the space between the front and rear lift assemblies 204, 206 enables the water tank 114 to be positioned underneath the debris hopper 202 and within the hopper system 200 as required or desired.

Each lift assembly 204, 206 also includes a first hydraulic fluid actuator 234 that extends between the transverse support 224 and the lift arm 226 and a second hydraulic fluid actuator 236 that extends between the lift arm 226 and the leg 228. The first actuator 234 may correspond to a lifting action of the lift assembly and is used to lift and lower the second end of the lift arm 226 while the first end pivots about pivot point 230. The second actuator 236 may corresponding to a tilting action of the lift assembly and is used to tilt the debris hopper 202 via the leg 228 about the pivot point 232. As illustrated in FIG. 3, both actuators 234, 236 are extended such that the debris hopper 202 is lifted and tilted with respect to the vehicle frame. In the example, both actuators 234, 236 are hydraulic cylinders, it is appreciated, however, that the actuators 234, 236 can be any other movement device or apparatus that enables the hopper system 200 to function as described herein.

The first actuator 234 is pivotably coupled to the transverse support 224 at a pivot point 238 and is pivotably coupled to the lift arm 226 at a pivot point 240 via a bracket 242. The pivot point 238 on the transverse support 224 is below and inwardly offset from the pivot point 230 of the first end of the lift arm 226. The bracket 242 is mounted to the lift arm 226 and positioned between the two ends. The pivot point 240 of the first actuator 234 on the bracket 242 is disposed below the lift arm 226. This configuration enables the first actuator 234 to lift and lower the lift arm 226.

The second actuator 236 is pivotably coupled to the lift arm 226 at a pivot point 244 on the bracket 242 and is pivotably coupled to the leg 228 at a pivot point 246. The pivot point 244 on the bracket 242 is disposed above the lift arm 226. As such, both the first and second actuators 234, 236 are coupled to the bracket 242. The pivot point 246 on the leg 228 is between and inwardly offset from the pivot point 232 of the second end of the lift arm 226 and the bottom wall 214 of the debris hopper 202. This configuration enables the second actuator 236 to tilt the debris hopper 202 relative to the lift arm 226.

In the example, the bracket 242 can be formed with two spaced apart plates, similar to the transverse support 224 and the leg 228, the lift arm 226 and the first and second actuators 234, 236 can be aligned between the spaced apart plates. As such, the transverse support 224, the lift arm 226, the leg 228, and the first and second actuators 234, 236 are all aligned along a transverse plane and below the debris hopper 202. This configuration enables the lift assemblies 204, 206 to be folded and stacked underneath the debris hopper 202. Compacting the components of the lift assemblies 204, 206, allows the space between the lift assemblies to house other sweeper components such as the water tank 114, an oil tank (not shown), a battery pack (not shown), etc.

Additionally, the lift assemblies 204, 206 do not have many moving parts so that the assemblies are light weight and easy to operate and maintain.

Figure 4:
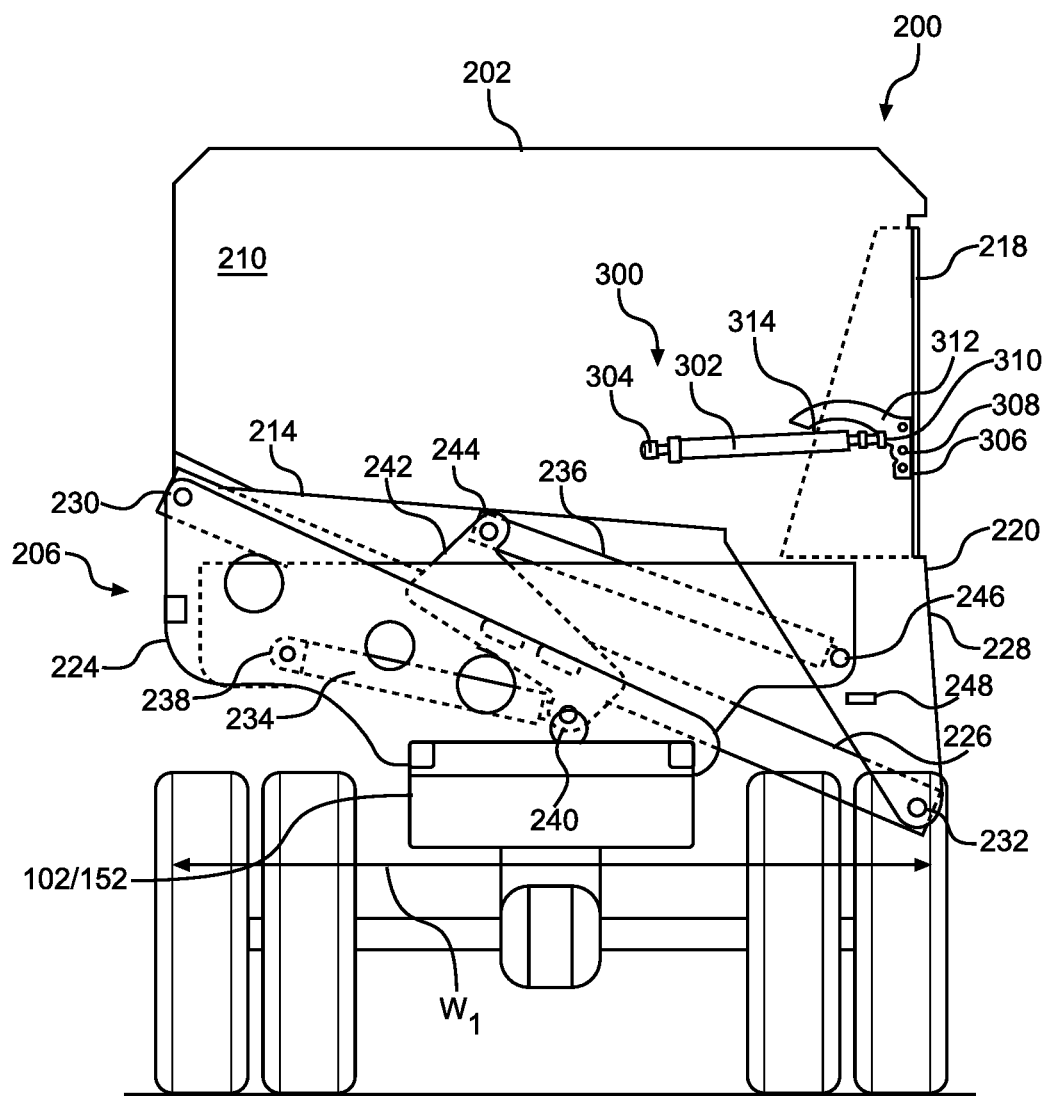
FIG. 4 is a rear view of the hopper system shown in FIG. 3 in a stored position.

FIG. 4 is a rear view of the hopper system 200 in a stored position. Certain components are described above, and thus, are not necessarily described further. In the stored position, the debris hopper 202 is fully lowered with respect to the elongate frame 102, 152 of the sweeper and the first and second actuators 234, 236 are retracted. The stored position enables the sweeper to collect debris as described herein and move along the roadway. In the example, the door 218 is on the right hand side of the sweeper when looking at FIG. 4. However, it is appreciated that the position of the door 218, and thus the other components, can be reversed as required or desired (e.g., on the left hand side of the sweeper). The leg 228 extends below the door 218 and the pivot point 232 with the lift arm 226 is positioned below the transverse support 224 because of the distance $D_1$ (shown in FIG. 3). The pivot point 230 between the transverse support 224 and the lift arm 226 is on the left hand side of the sweeper and above the pivot point 232. As such, the lift arm 226 is disposed at an angle relative to the horizontal.

In the stored position, the lift assemblies 204, 206 are folded and stacked underneath the debris hopper 202 with a width Wi that does not protrude from the sides of the sweeper. Additionally, the bottom wall 214 of the debris hopper 202 may rest at least partially on top of the transverse support 224 and the bracket 242. An angle sensor 248 can be coupled to the debris hopper 202 to monitor a leveling angle of the debris hopper. In the example, the angle sensor 248 is positioned on the leg 228. Before beginning to lift the debris hopper 202, tip-over prevention checks that the sweeper is on relatively flat ground so that when the debris hopper 202 is lifted the sweeper does not tip over. In an aspect, relatively flat is in a range of within about 4° relative to horizontal. The angle sensor 248 is used to monitor the hopper to ground orientation. Additionally, the angle sensor 248 can be used for the entire lift and tilt process as described further below in reference to FIGS. 8-11.

The debris hopper 202 may also include a latch assembly 300 that is configured to secure the door 218 in a closed position and as illustrated in FIG. 4. Generally, the latch assembly 300 includes a fluid actuator 302 coupled to the debris hopper 202 at a pin 304, and a latch plate 306 pivotably coupled to the door 218 at a pivot point 308 and coupled to the other end of the fluid actuator 302 at pin 310. The latch plate 306 has a hook 312 that engages with a lock pin 314 mounted on the debris hopper 202. The debris hopper 202 can include the latch assembly 300 on both the front and rear sides of the door 218 as required or desired. The latch assembly 300 is described in further detail below in reference to FIG. 13.

Figure 5:
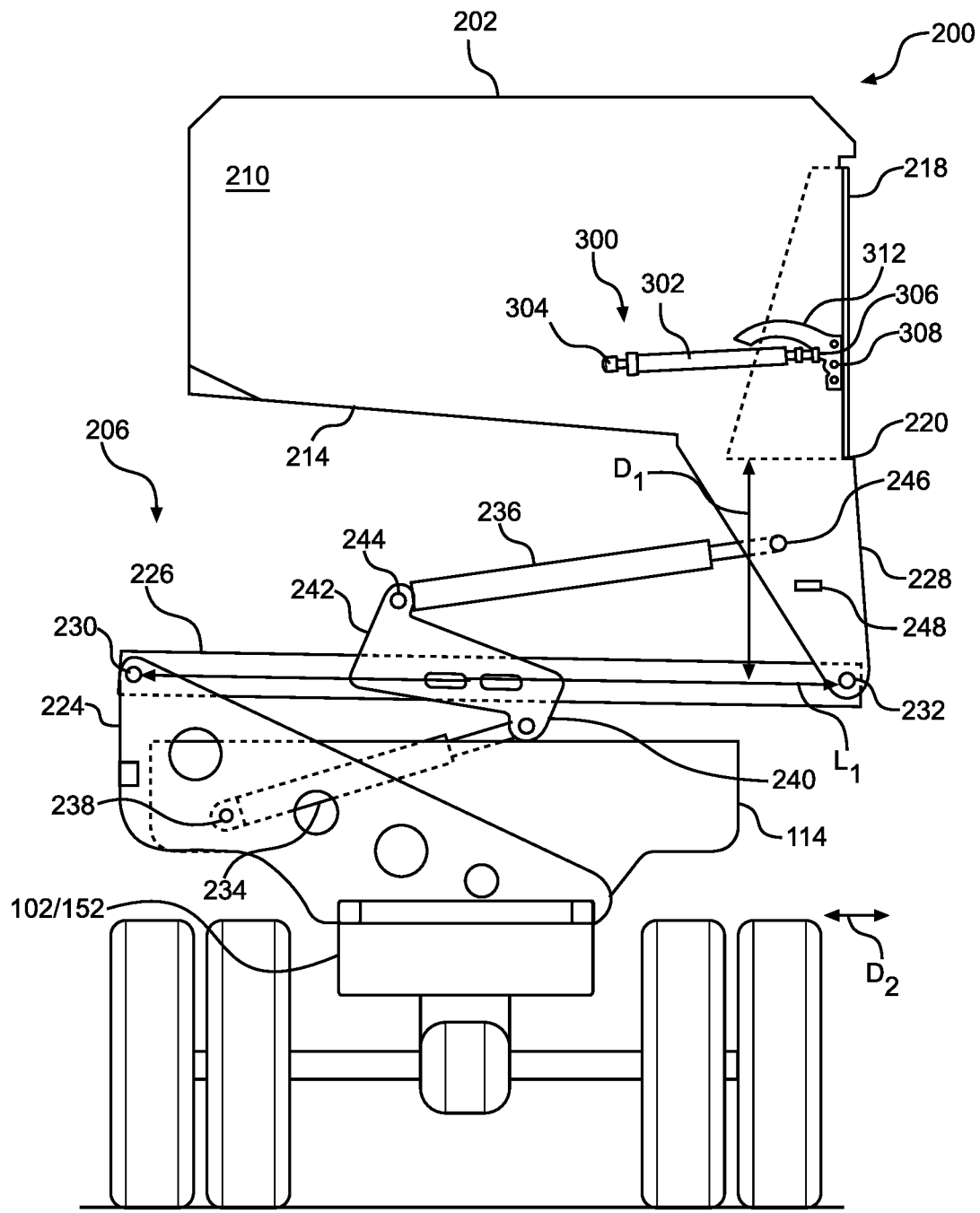
FIG. 5 is a rear view of the hopper system shown in FIG. 3 in a partially raised position.

FIG. 5 is a rear view of the hopper system 200 in a partially raised position. Certain components are described above, and thus, are not necessarily described further. In the partially raised position, the debris hopper 202 begins to lift with respect to the elongate frame 102, 152 of the sweeper. The first actuator 234 extends so as to pivot the lift arm 226 relative to the transverse support 224 and about the pivot point 230. As such, the second end of the lift arm 226 that supports the leg 228 rises. Additionally, the second actuator 236 correspondingly extends so as to maintain the debris hopper 202 in a horizontally level angle via the leg 228.

The lift arm 226 has a length Li that is greater than the sweeper width. As such, when the lift arm 226 is oriented substantially horizontally, as illustrated in FIG. 3, the debris hopper 202 and the leg 228 swing out and protrude from the sweeper a distance $D_2$. In an aspect, however, this distance $D_2$ is less than or equal to 5 inches away from the sweeper. The short distance $D_2$ is enabled by reducing the length Li of the lift arm 226 to be close to the sweeper width, while positioning the pivot points 230, 232 on opposite sides of the sweeper. Additionally, the elongated leg 228 is provided so as to extend the reach of the lift arm 226 with the debris hopper 202 by the distance $D_1$. As such, by lowering the pivot point 232 below the bottom wall 214 of the debris hopper 202 and including the second actuator 236, the lift height of the hopper system 200 is increased while reducing the swing out distance of the debris hopper 202 and increasing performance of the side dump operations. In the stored position, as illustrated in FIG. 4, the lift arm 226 is stored at an angle relative to the horizontal so that the hopper system 200 can fit within the sweeper width.

Figure 6:
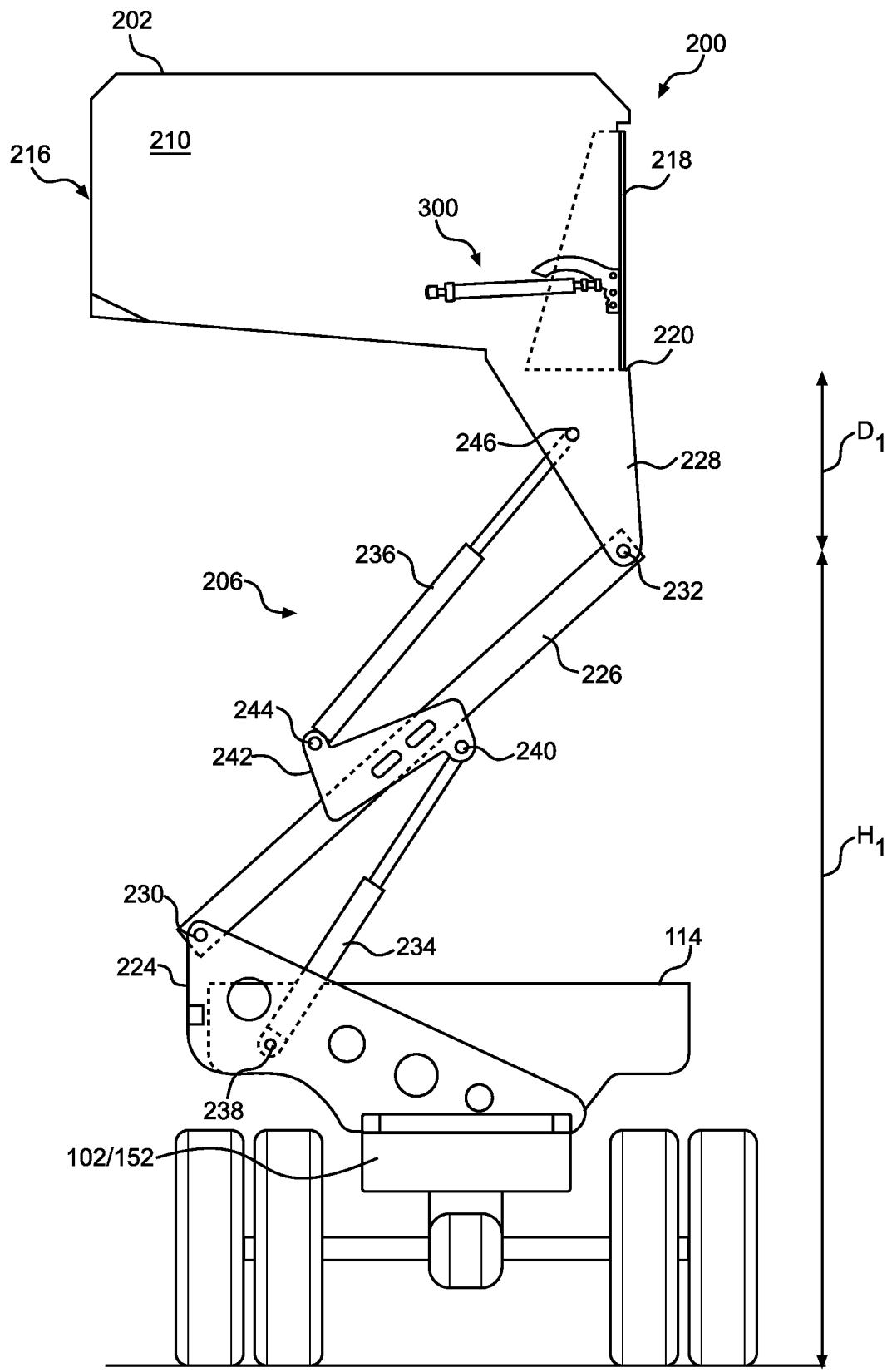
FIG. 6 is a rear view of the hopper system shown in FIG. 3 in a raised position.

FIG. 6 is a rear view of the hopper system 200 in a raised position. Certain components are described above, and thus, are not necessarily described further. In the raised position, the debris hopper 202 is further lifted with respect to the elongate frame 102, 152 of the sweeper. The first actuator 234 continues to extend so as to pivot the lift arm 226 relative to the transverse support 224 and about the pivot point 230. Additionally, the second actuator 236 correspondingly extends so as to maintain the debris hopper 202 in a horizontally level angle via the leg 228. Because of the swing of the lift arm 226, the debris hopper 202 when in the raised position, is aligned over the sweeper. In some raised positions, the side wall 216 of the debris hopper 202 may protrude from the side of the sweeper.

In the example, because the leg 228 is fixed to the debris hopper 202, a height Hi that the debris hopper 202 is raised above the ground surface is defined by the pivot point 232. However, the bottom wall 214 of the debris hopper 202 is positioned above the pivot point 232 by the leg distance $D_1$. As such, via the configuration of the lift assembly 206, the door 218 is highly raised relative to the ground surface.

Figure 7:
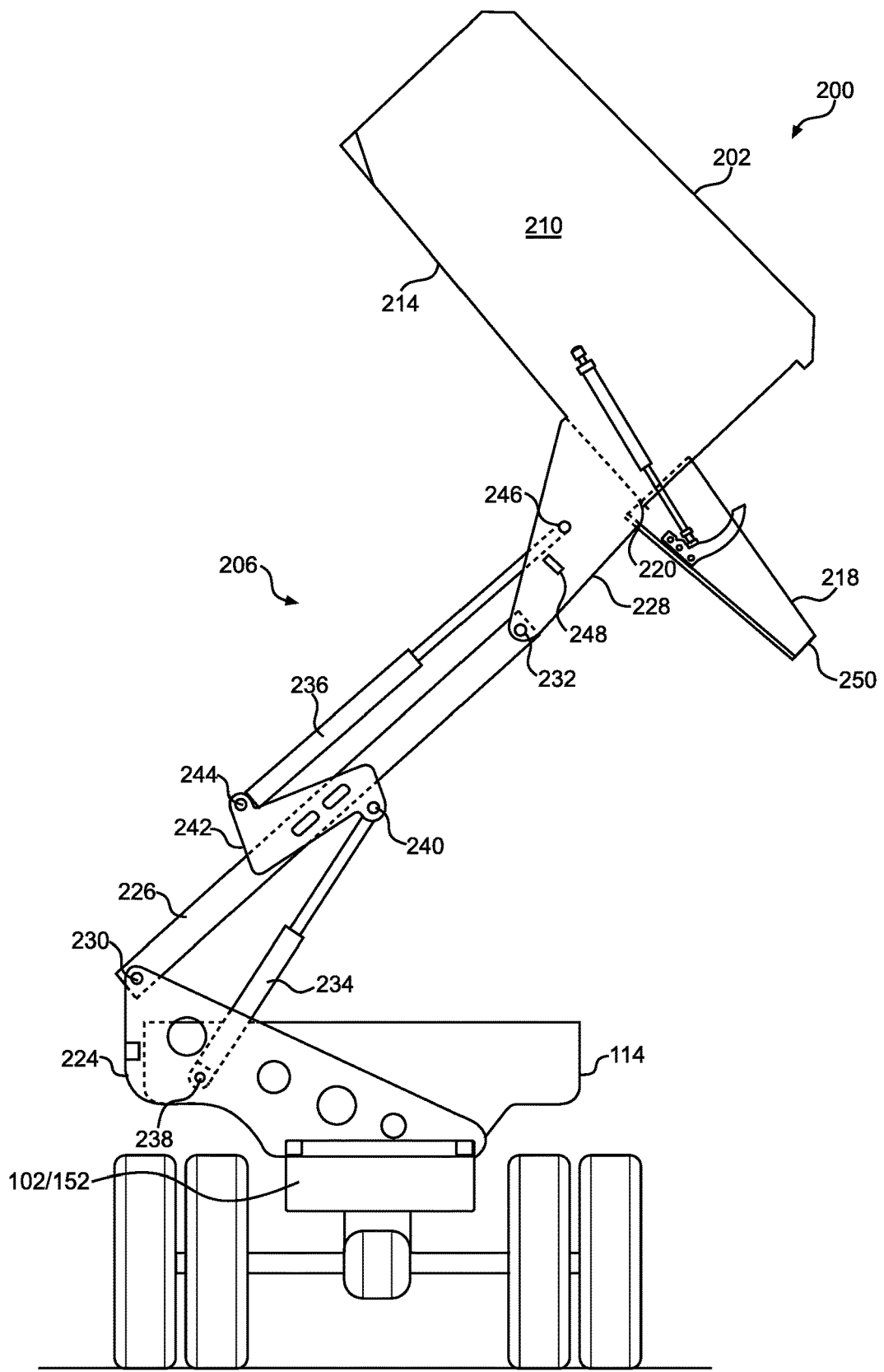
FIG. 7 is a rear view of the hopper system shown in FIG. 3 in a raised and tilted position.

FIG. 7 is a rear view of the hopper system 200 in a raised and tilted position. Certain components are described above, and thus, are not necessarily described further. In the raised and tilted position, the debris hopper 202 is lifted as described above in reference to FIG. 6. Additionally, the second actuator 236, instead of keeping the debris hopper 202 level, tilts the hopper 202 about the pivot point 232 so that debris can be dumped out and transferred out of the sweeper. In an aspect, the debris hopper 202 can be tilted to a dump angle of about 50° relative to horizontal. This angle can be measured by the angle sensor 248. As illustrated in FIG. 6, the door 218 has been rotated towards an open position about pivot point 220. In the example, the door 218 extends from the bottom wall 214 of the debris hopper 202 and is used to channel debris from the hopper 202 to a container or other receptacle and reduce spillage. The latch assembly 300 (shown in FIGS. 4-5) is not illustrated for clarity. During the tilting operation of the debris hopper 202, the first actuator 234 can be used in conjunction with the second actuator 236 to move the pivot point 232 so as to locate an edge 250 of the door 218 in a required or desired positon for dumping.

In the example, the debris hopper 202 can perform a lift and tilt cycle for a dumping operation with the actuators 234, 236 operating in two different phases. In one phase, the debris hopper 202 is being lifted, while the tilt orientation of the hopper 202 is maintained in a substantially horizontal orientation. This phase is illustrated, for example, in FIGS. 4-6, and the first actuator 234 is primarily used for lifting, while the second actuator 236 maintains the tilt angle of the debris hopper 202. In another phase, the debris hopper 202 is being tilted, while the lift position of the hopper 202 is maintained so that the edge 250 of the door 218 is within the receiving debris container. This phase is illustrated, for example, in FIG. 7, and the second actuator 236 is primarily used for tilting, while the first actuator 234 maintains the lift position of the debris hopper 202. As such, both actuators 234, 236 are utilized in both phases, and as such can be coupled together in series and in flow communication so as to reduce extra mechanical linkage and simplify hydraulic control. Through actuator cylinder length and size selection, this configuration can achieve efficient lift and tilt cycles by utilizing the actuators 234, 236 to at least partially drive one another. The lift and tilt cycle of the hopper system 200 is described in further detail below in FIGS. 8-11.

Figure 8:
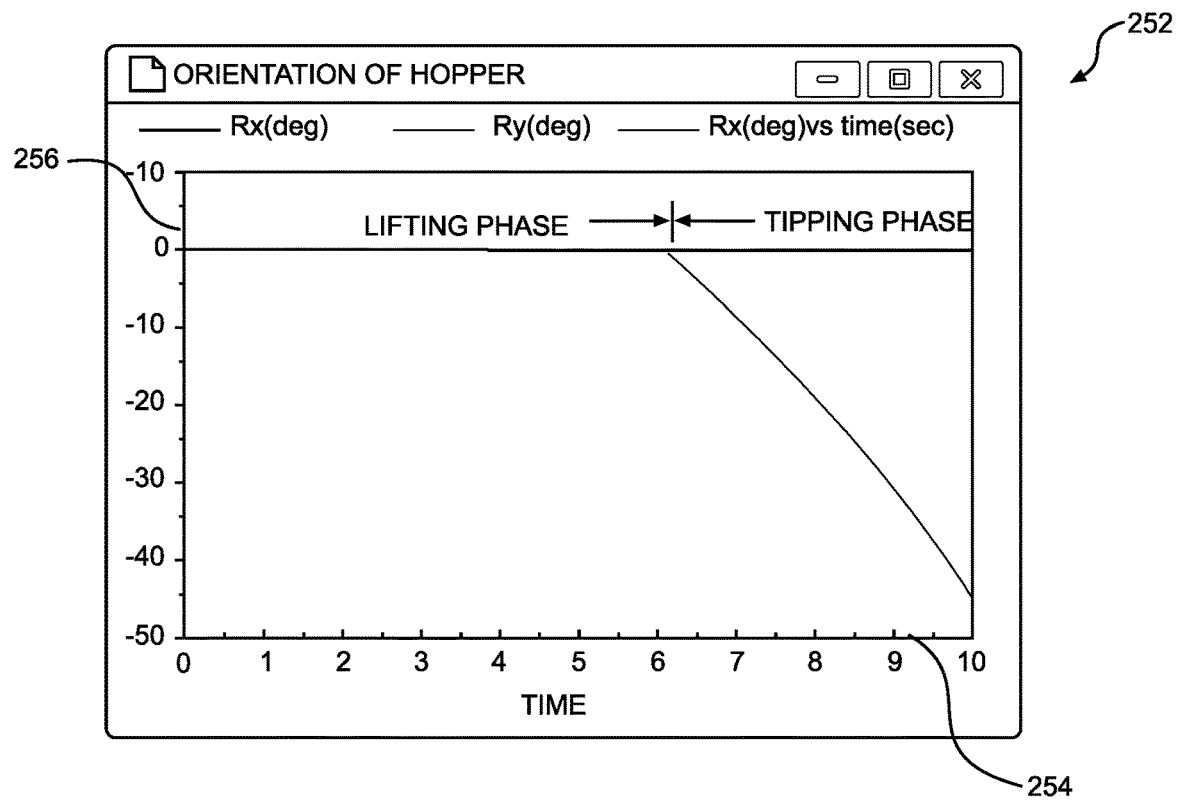
FIG. 8 is a plot illustrating a debris hopper orientation during a lift and tilt cycle.

FIG. 8 is a plot illustrating a debris hopper orientation 252 during a lift and tilt cycle. The plot 252 has an x-axis 254 that represents cycle time and a y-axis 256 that represents tilt angle of the debris hopper relative to horizontal. In an example, the tilt angle can be measured by the angle sensor 248 (shown in FIGS. 4-7). As described above, the lift and tilt cycle of the debris hopper can be split into two different phases. A lifting phase that maintains the tilt angle of the debris hopper relatively horizontal (e.g., about 0°) and a tipping phase that tilts the debris hopper to expel debris (e.g., up to approximately 50°). It should be appreciated, that the cycle will reverse itself when retracting the hopper system to store on the sweeper.

Figure 9:
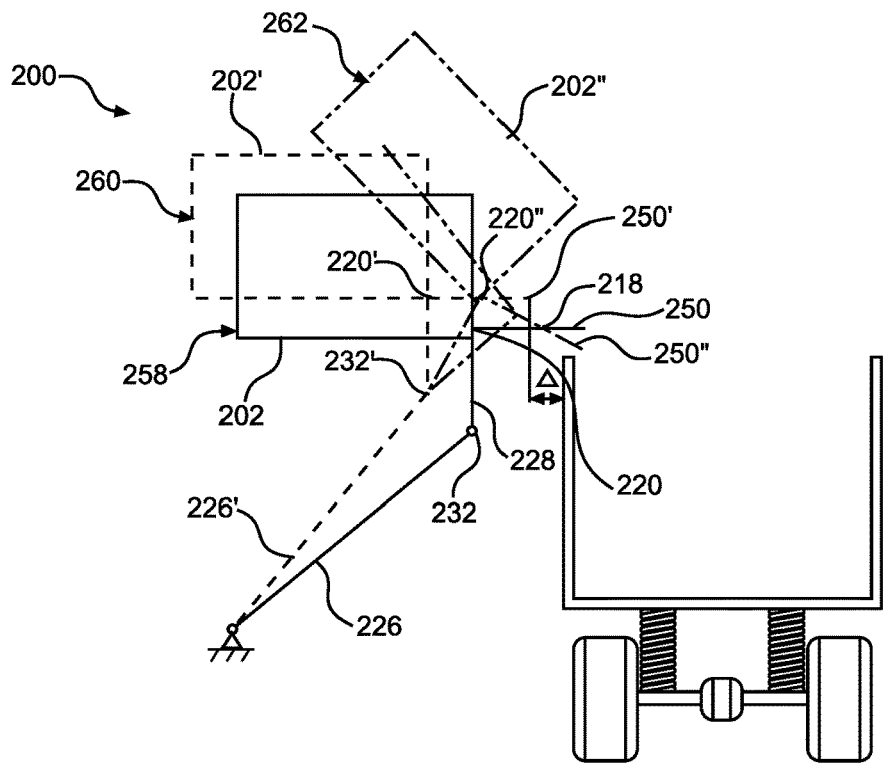
FIG. 9 is a schematic diagram of the hopper system shown in FIG. 3 during the lift and tilt cycle.

FIG. 9 is a schematic diagram of the hopper system 200 during the lift and tilt cycle. During the lifting phase and as illustrated in solid lines 258, the lift arm 226 is lifted so as to raise the pivot point 232 of the leg 228 and position the debris hopper 202 at least partially above the receiving container. In the raised position, the door 218 of the debris hopper 202 can open about pivot point 220 and have its edge 250 extend over the receiving container. This lift position is typically the most efficient position so as to avoid unnecessarily using energy to lift the debris hopper 202 higher than necessary. However, when tilting the debris hopper 202, the door 218 will contact the receiving container and not allow all the debris to be channeled out of the hopper 202. As such, the debris hopper 202' has to lift further above the ground prior to tiling. This further raised position is illustrated in dashed lines 260. Due to the swing arm effect of the lift arm 226' and raising the pivot point 232', the pivot point 220' and the edge 250' of the door moves inward a distance A and forms an undesirable gap with the receiving container. This gap can be covered by increasing the length of the door 218, however, the debris hopper 202' then has to be lifted even higher.

In the example, instead of lifting the debris hopper 202' higher and then tilting the hopper 202' in two separate operations, the hopper system 200 enters the tipping phase as illustrated in dash-dot lines 262. The tipping phase concurrently tilts and lifts the debris hopper 202" so that as the pivot point 232 of the lift arm 226 moves to 232' and accommodates the tilt angle of the hopper 202", the pivot point 220" of the door 218" lifts higher and moves slightly outwardly so that the edge 250" of the door maintains position over the receiving container. As such, the door can have a shorter overall length and debris spillage is reduced. Coordinating the tilt and lift operations in the tipping phase can be referred to as tilt-synchronizing, and in some examples, enabled by relating cylinder sizes of the two actuators.

Figure 10:
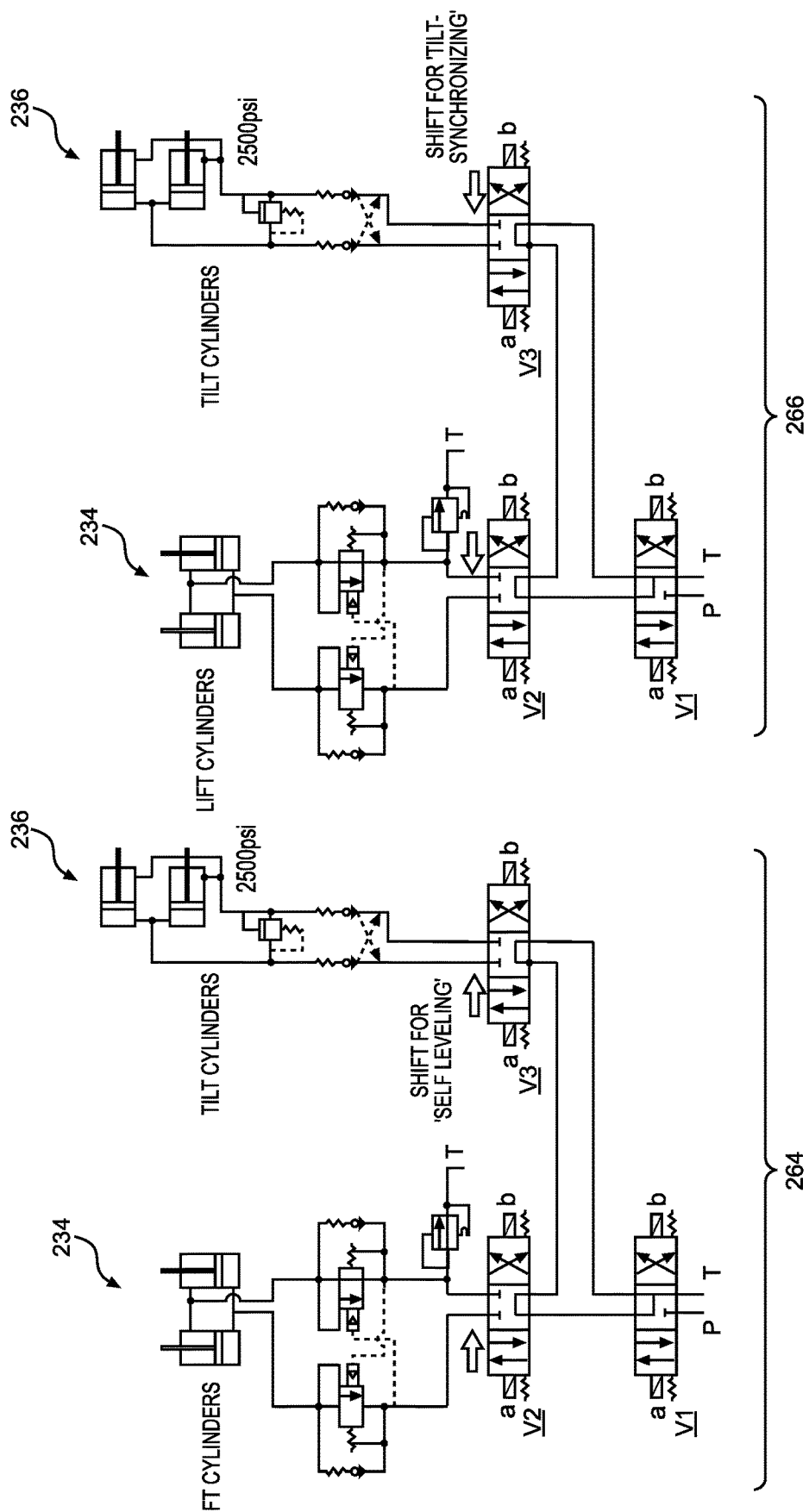
FIG. 10 is a schematic diagram of an actuator connection system of the hopper system shown in FIG. 3.

FIG. 10 is a schematic diagram of an actuator connection system of the hopper system 200 (shown in FIGS. 1-7). As described above, the first actuator 234 and the second actuator 236 are coupled in series and in hydraulic flow communication. During a lifting phase 264, the first actuator 234 (e.g., lift cylinder) is used to lift the debris hopper and the connection between the actuators can be used to self-level the hopper via the second actuator 236 (e.g., tilt cylinder) that controls the tilt level. That is, the first actuator 234 is used to drive the second actuator 236 and the hydraulic fluid flow is channeled through the first actuator 234 to the second actuator 236. This operation can be referred to as self-leveling. During a tipping phase 266, the second actuator 236 is used to tilt the debris hopper and the connection between the actuator can be used to synchronize lifting with tilting via the first actuator 234. That is, the second actuator 236 is used to drive the first actuator 234 and the hydraulic fluid flow is channeled through the second actuator 236 to the first actuator 234, reversed from the lifting phase 264. The self-leveling and tilt-synchronizing of the hopper system 200 are enabled at least partially by the cylinder-to-cylinder size ratio of the actuators 234, 236 and changing the cylinder-to-cylinder connection through directional valves (e.g., $V_1$, $V_2$, and $V_3$).

In the example, the hopper system 200 increases energy efficiencies. It avoids lifting the debris hopper high and tilting separately. Instead, the actuator connection system enables the debris hopper to discharge debris while still rising and even utilize holding pressure in the second actuator 236 at the end of the tipping phase to extend the first actuator 234.

Figure 11:
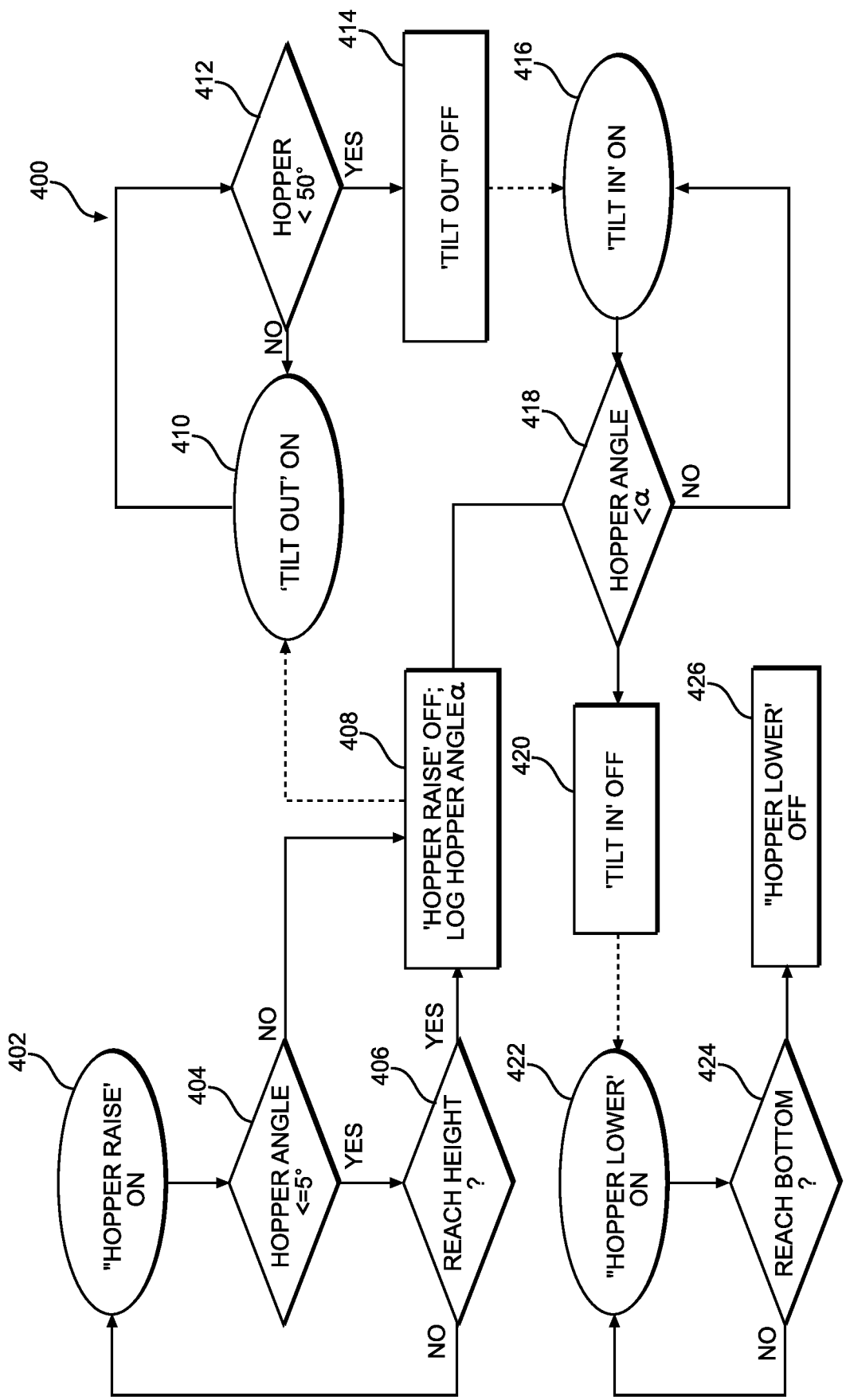
FIG. 11 is a flowchart illustrating an exemplary method of lifting and tilting a debris hopper on a vehicle.

FIG. 11 is a flowchart illustrating an exemplary method 400 of lifting and tilting a debris hopper on a vehicle. In the example, the vehicle can be a sweeper as described above and includes a frame and at least one lift and tilt assembly supporting the debris hopper on the fame. The method 400 begins with lifting the debris hopper to a predetermined height (operation 402) via the at least one lift and tilt assembly. In an aspect, the predetermined height can be based on a height of the receiving container. During the lift of the debris hopper, the horizontal hopper angle can be monitored (operation 404) so as to reduce tip over of the vehicle and the hopper system. In the example, the debris hopper is tilted to maintain a horizontal level, and as such, the lifting operation may include both lifting and tilting the debris hopper. In an aspect, the hopper angle is monitored so that it is within or equal to 5° from horizontal. If the hopper angle exceeds 5° then the lift operation will be stopped. In some examples, the debris hopper can then be automatically lowered back to the stored position. Once the predetermined height is reached (operation 406) the lift of the debris hopper is stopped (operation 408). Additionally, the horizontal hopper angle can be logged and stored (again at operation 408) when the lifting operation is stopped. When the predetermined height is reached (operation 406) the operation may also include opening and extending a chute from the debris hopper prior to tilting the hopper.

After the debris hopper is lifted, the debris hopper is tilted relative to the horizontal level (operation 410). During the tilting operation, the tilt angle of the debris hopper is monitored (operation 412) so as to stop tilting at a predetermined angle (operation 414). In an aspect, this predetermined angle may be equal to or less than 50°. In the example, a position of the extended chute is maintained relative to the receiving container, and as such, the tilting operation may include both lifting and tilting so that the position of the chute is synchronized with the movement of the lift and tilt assembly. When the system changes between the lifting operation and the tilting operation, in some examples, a direction fluid valve between hydraulic actuators may be switched so as to change the cylinder drive between two cylinders. In as aspect, the operation may occur when the predetermined height is reached (operation 406).

Once debris has been dumped out of the debris hopper, the tilting components reverse direction and retract the debris hopper back towards the horizontal level (operation 416). Because the horizontal hopper angle is logged (operation 408), the tilt angle of the debris hopper is monitored (operation 418) so that the debris hopper can return to its originally logged horizontal level and stop the titling of the hopper (operation 420). The debris hopper can then return to a lifting operation that lowers the debris hopper back into the vehicle (operation 422). In some examples, the vehicle may include a pressure sensor to monitor when the debris hopper is completely lowered (operation 424). Once completely lowered, the tilting and lifting operation can be turned off (operation 426). In an aspect, the pressure sensor may be used to monitor debris weight within the debris hopper when operating the sweeper. In another aspect, debris weight within the debris hopper can be monitored using force vectors from the first and second actuators. By monitoring debris weight and level angle of the debris hopper, overloading and/or tip-over during dumping operations are reduced or prevented.

Figure 12:
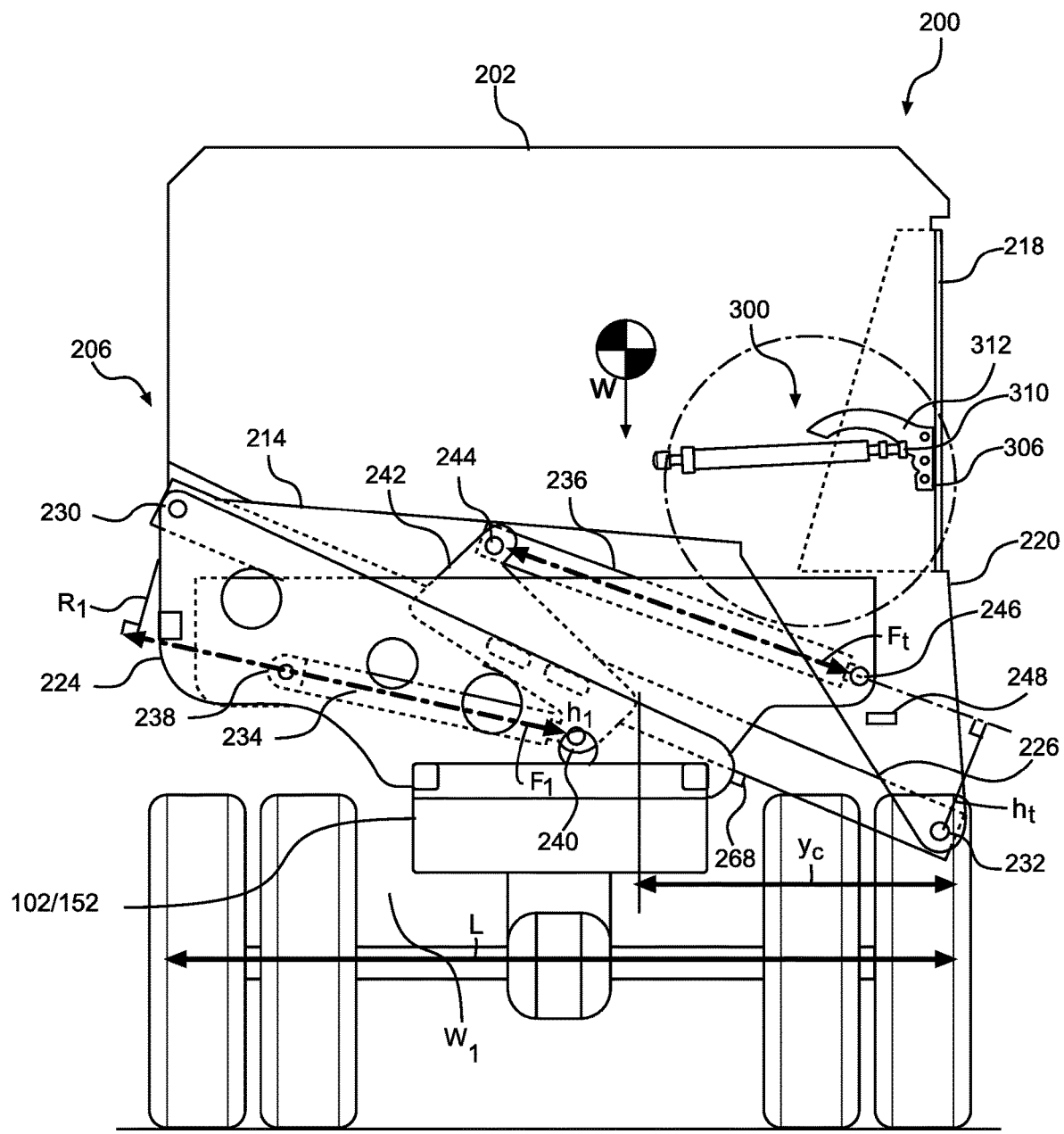
FIG. 12 is a schematic diagram of the hopper system shown in FIG. 3 in a stored position.

FIG. 12 is a schematic diagram of the hopper system 200 in a stored position. Certain components are described above, and thus, are not necessarily described further. Because the front and rear lift assemblies (rear lift assembly 206 shown in FIG. 12) are disposed below the debris hopper 202, a load weight W of debris collected within the debris hopper 202 can be determined and monitored with a pressure sensor 268. In the example, the pressure sensor 268 is coupled to the transverse support 224 at a rest point of the lift arm 226 when the lift arm 226 is in the stored position. The pressure sensor 268 is configured to monitor pressure generated from the lift arm 226 so as to determine the load weight W held by the debris hopper 202. In other examples, the pressure sensor 268 can be coupled to the elongate frame 102, 152 of the sweeper.

Additionally or alternatively, the load weight W of the debris hopper 202 can be determined by monitoring a first actuator force Fi and/or a second actuator force Ft. By knowing the force vectors Fi and Ft and the geometry of the lift assembly 206, the load weight W can be determined. The geometry of the lift assembly 206 can include a horizontal length L between the end pivot points 230, 232 of the lift arm 226, an offset height hi of the first actuator 234 from a centerline of the lift arm 226, an offset height $h_t$ of the second actuator 236 from a centerline of the lift arm 226, and a horizontal distance $y_c$ of the center of gravity of the debris hopper 202. Because the load weight W held by the debris hopper 202 and the level angle of the debris hopper 202 via the angle sensor 248 can be determined. The hopper system 200 can use the information to reduce or prevent overloading and tip-over during dumping operations.

Figure 13:
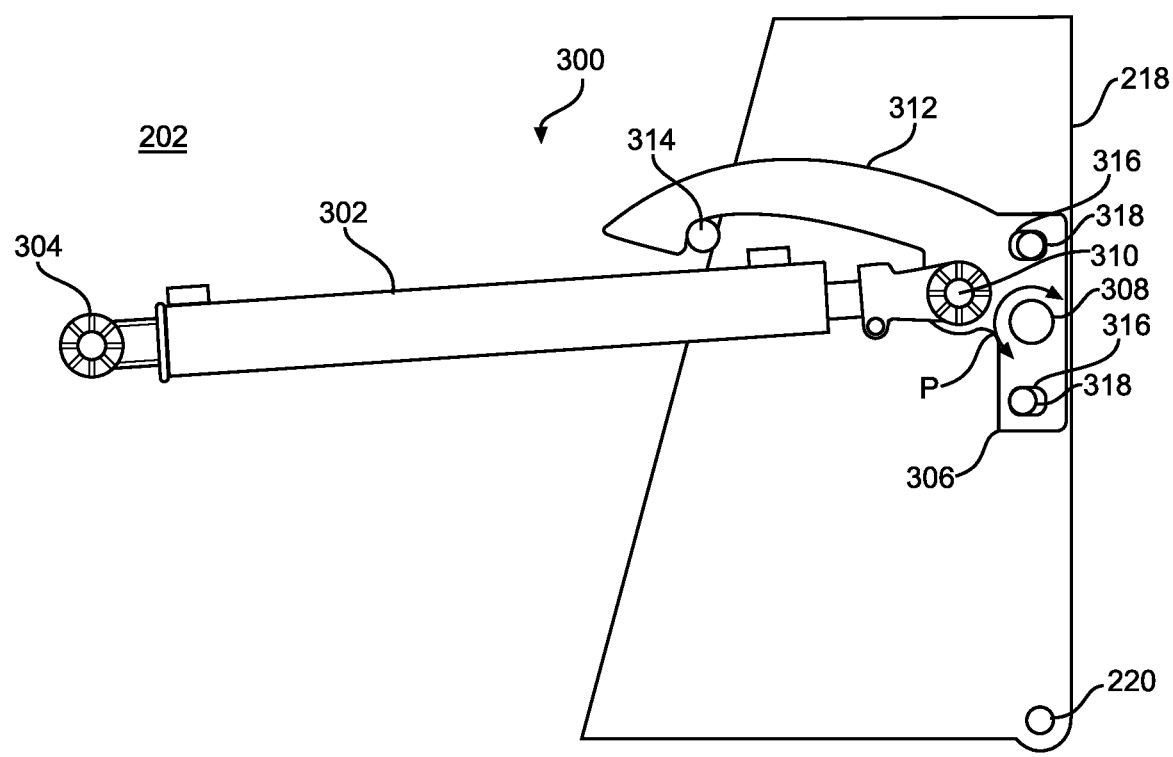
FIG. 13 is a side view of an exemplary latch assembly that can be used with the hopper system shown in FIG. 3.

FIG. 13 is a side view of an exemplary latch assembly 300 that can be used with the hopper system 200 (shown in FIG. 3). The latch assembly 300 is coupled between the debris hopper 202 and the door 218 so as to provide an automatically locking latch for the door 218 and reduce or prevent debris spillage from the debris hopper 202 during sweeper operation. The door 218 is rotatably coupled to the debris hopper 202 and moveable between an open position and a closed position (as illustrated in FIG. 13) relative to the debris hopper 202. For example, the door 218 can rotate about pivot point 220 disposed at a lower portion of the debris hopper 202. The latch assembly 300 includes a fluid actuator 302 coupled at one end to the debris hopper 202 at a pin 304 and at the other end to the door 218. The fluid actuator 302 is configured to rotate the door 218 between the open and closed positions. In the example, actuator 302 is a hydraulic cylinder, it is appreciated, however, that the actuator 302 can be any other movement device or apparatus that enables the latch assembly 300 to function as described herein. Additionally, the latch assembly 300 is compact such that the front and rear side walls of the debris hopper 202 remain relatively unobstructed to allow interfaces with the components of the sweeper as described above in reference to FIGS. 1 and 2.

The latch assembly 300 also includes a latch plate 306 pivotably coupled to the door 218 at a pivot point 308 and coupled to the other end of the fluid actuator 302 at pin 310. The latch plate 306 is moveable between a locked position (as illustrated in FIG. 13) and an unlocked position relative to the debris hopper 202. The latch plate 306 has a hook 312 that engages with a lock pin 314 mounted on the debris hopper 202. In the locked position, the latch plate 306 is engaged with the lock pin 314 to prevent to door 218 from rotating towards the open position. The hook 312 is used to provide extra security to hold the door 218 tightly in the closed position. In the closed position, the hook 312 engages with the lock pin 314 with its arc radius centered at pivot point 308. Under the action of gravity, the hook 312 remains engaged with the lock pin 314 even when there is no pressure force from the fluid actuator 302 holding the door 218 closed.

To unlock the latch plate 306, the fluid actuator 302 pivots P the latch plate 306 about the pivot point 308 to the unlocked position prior to the door 218 rotating towards the open position. Once the hook 312 is disengaged from the lock pin 314 the fluid actuator 302 pushes against the latch plate 306 to open the door 218. The pivoting movement P of the latch plate 306 is defined by upper and lower elongated slots 316 with upper and lower stops 318 from the door 218 received therein. The slots 316 and stops 318 configuration enables the hook 312 to selectively engage with the lock pin 314 while still enabling the fluid actuator 302 to apply opening and closing forces on the door 218. When the fluid actuator 302 is closing the door 218, the hook 312 is allowed to slam over the lock pin 304 via the pivoting movement P of the latch plate 306 and the stops 318 being able to slide within the elongated slots 316. As such, the locking and unlocking of the latch plate 306 is automatic and does not require further operational manipulation by the sweeper operator.

Figure 14:
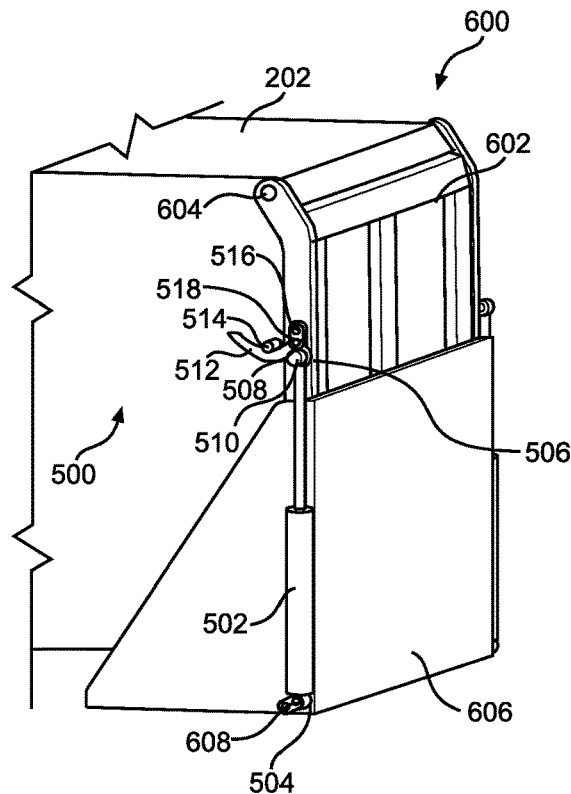
FIG. 14 is a perspective view of another latch assembly and door system in a locked and closed configuration that can be used with the hopper system shown in FIG. 3.

FIG. 14 is a perspective view of another latch assembly 500 and door system 600 in a locked and closed configuration that can be used with the hopper system 200 (shown in FIG. 3). In this example, the debris hopper 202 is similar to the example described above and is configured to lift and tilt to enable side dumping operations on the sweepers. However, the debris hopper 202 has the door system 600 that has a door 602 rotatably coupled to the debris hopper 202 at a pivot point 604 disposed at a top end of the debris hopper 202. The door 602 is moveable between an open position and a closed position, and the closed position is illustrated in FIG. 14. Additionally, the door system 600 has a chute 606 that is rotatably coupled to the debris hopper 202 at a pivot point 608 disposed at a bottom end of the debris hopper 202. The chute 606 is moveable between an extended position and a retracted position, and the retracted position is illustrated in FIG. 14. When opening the door system 600 the chute 606 extends first so as to reduce debris from spilling out of the debris hopper 202 during dumping operations.

The latch assembly 500 is coupled between the chute 606 and the door 602 so as to provide an automatically locking latch for the door 602. The latch assembly 500 can be on both the front and rear sidewalls of the debris hopper 202. The latch assembly 500 includes a fluid actuator 502 coupled at one end to the chute 606 at a pin 504 and at the other end to the door 602. The fluid actuator 502 is configured to rotate the door 602 between the open and closed positions and the chute 606 between the extended and retracted positions. In the example, actuator 502 is a hydraulic cylinder, it is appreciated, however, that the actuator 502 can be any other movement device or apparatus that enables the latch assembly 500 to function as described herein. Additionally, the latch assembly 500 is compact such that the front and rear side walls of the debris hopper 202 remain relatively unobstructed to allow interfaces with the components of the sweeper as described above in reference to FIGS. 1 and 2.

The latch assembly 500 also includes a latch plate 506 pivotably coupled to the door 602 at a pivot point 508 and coupled to the other end of the fluid actuator 502 at pin 510. The latch plate 506 is moveable between a locked position (as illustrated in FIG. 14) and an unlocked position relative to the debris hopper 202. The latch plate 506 has a hook 512 that engages with a lock pin 514 mounted on the debris hopper 202. Similar to the example described above in FIG. 13, in the locked position, the latch plate 506 is engaged with the lock pin 514 to prevent to door 602 from rotating towards the open position. Via the connection between the chute 606 and the fluid actuator 502, the hook 512 remains engaged with the lock pin 514 in both the extension and retraction positions of the chute 606, thereby holding the door 602 closed. This engagement is held even when there is no pressure force from the fluid actuator 502 holding the door system 600 closed. To facilitate the latch plate 506 pivoting between lock and unlock positions, the latch plate 506 has an elongated slot 516 and the door 602 includes a corresponding stop 518. The opening of the door system 600 via the latch assembly 500 is described further below in reference to FIGS. 15-17.

Figure 15:
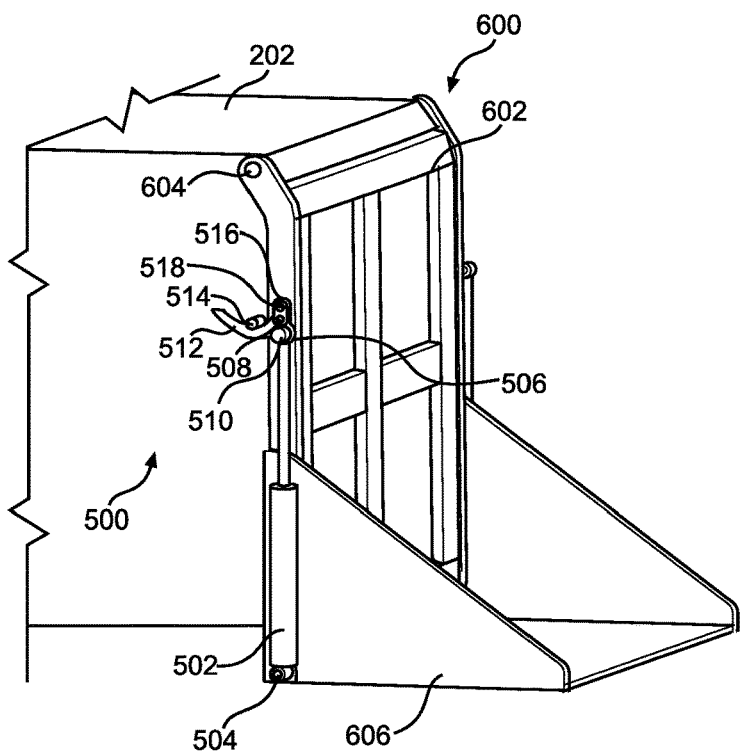
FIG. 15 is a perspective view of the latch assembly and door system shown in FIG. 14 in a locked and chute extended configuration.

FIG. 15 is a perspective view of latch assembly 500 and door system 600 in a locked and chute extended configuration. Certain components are described above, and thus, are not necessarily described further. To open the debris hopper 202, the latch assembly 500 first extends the chute 606 prior to unlocking and opening the door 602 and this chute extended position is illustrated in FIG. 15. The fluid actuator 502 rotates the chute 606 about the pivot point 608 (shown in FIG. 14) by pushing against the door 602 so as to induce the rotational movement. The pin 504 that couples the fluid actuator 502 to the chute 606 is offset from the pivot point 608. Because the chute 606 is easier to open than the door 602, the latch plate 506 does not unlock with this movement of the chute 606 and move away from the locked position as illustrated in FIG. 15. As such, prior to the latch plate 506 unlocking, the fluid actuator 502 moves the chute 606 into the extended position, while the hook 512 remains engaged to the lock pin 514 and the latch assembly 500 is in the locked position.

Figure 16:
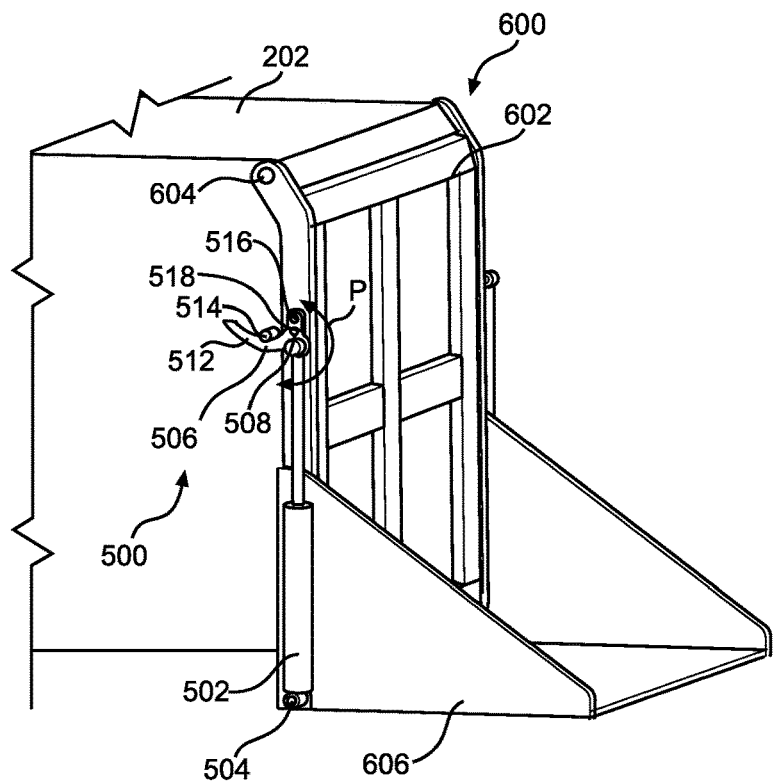
FIG. 16 is a perspective view of the latch assembly and door system shown in FIG. 14 in an unlocked and chute extended configuration.

FIG. 16 is a perspective view of the latch assembly 500 and door system 600 in an unlocked and chute extended configuration. Certain components are described above, and thus, are not necessarily described further. Once the chute 606 is moved to the extended position as illustrated in FIG. 16, continued actuation of the fluid actuator 502 pivots P the latch plate 506 about the pivot point 508 and into the unlocked position as illustrated in FIG. 16. In the unlocked position, the hook 512 is disengaged with the lock pin 514. The pivoting movement P is defined by the elongated slot 516 with the stop 518 from the door 602 being received therein. However, until the latch assembly 500 is moved to the unlocked position, the door 602 remains closed with respect to the debris hopper 202.

Figure 17:
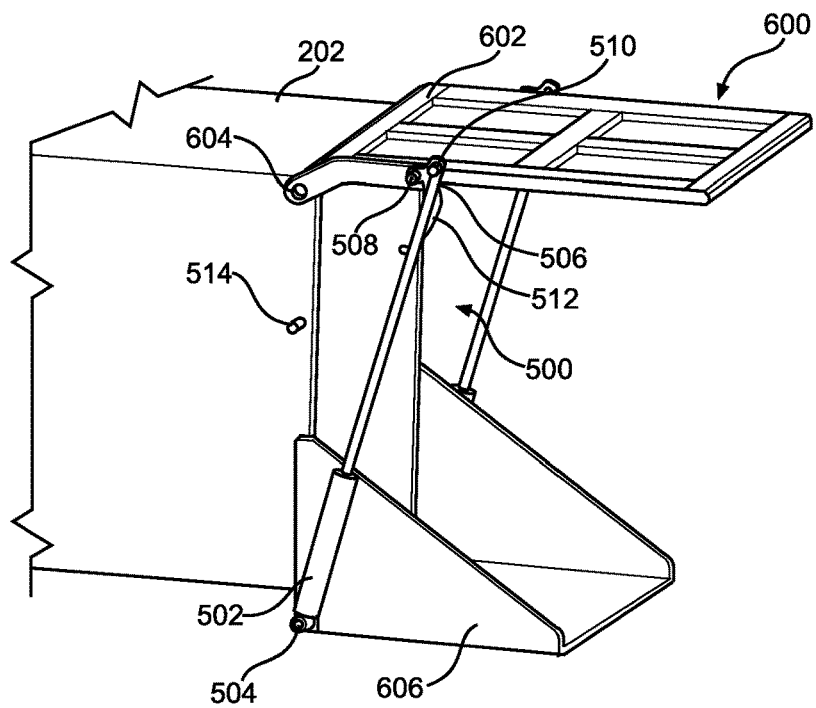
FIG. 17 is a perspective view of the latch assembly and door system shown in FIG. 14 in an unlocked and open configuration.

FIG. 17 is a perspective view of latch assembly 500 and door system 600 in an unlocked and open configuration. Certain components are described above, and thus, are not necessarily described further. As the actuation of the fluid actuator 502 continues, the door 602 moves towards an open position as illustrated in FIG. 17 because the force is now being applied directly into the door 602 and further pivoting of the latch plate 506 is prevented via the stop 518 (shown in FIG. 16). The latch assembly 500, thereby, remains in its unlocked position. As such, the latch plate 506 and the door 602 will rotate together about the pivot point 604 and the door 602 will open. The process described in FIGS. 14-17 can then be reversed so as to close the door system 600 and lock the latch assembly 500. When the fluid actuator 502 is closing the door 602, the hook 512 is allowed to slam over the lock pin 504 via the pivoting movement P of the latch plate 506 and the stop 518 being able to slide within the elongated slots 516 (shown in FIG. 16). As such, the locking and unlocking of the latch plate 506 is automatic and does not require further operational manipulation by the sweeper operator.

In other examples, the door 602 and the chute 606 may have separate actuators that generate rotational movement of each component. In this example, a door actuator can be anchored at the pivot point of the chute 606 and be used to open the door 602 as described in FIGS. 14-17, while the chute actuator can be used to open the chute 606 as described above in reference to FIG. 13. Either one or both of the discrete actuators can include a latch assembly as described herein and as required or desired.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified examples and examples. In this regard, any number of the features of the different examples described herein may be combined into one single example and alternate examples having fewer than or more than all of the features herein described are possible.

While various examples have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A vehicle comprising:
an elongate frame extending between a front and a rear of the vehicle;
a debris hopper comprising a door disposed along a side of the vehicle; and
front and rear lift assemblies supporting the debris hopper on the elongate frame and configured to lift and tilt the debris hopper relative to the elongate frame, wherein each lift assembly comprises:
a transverse support mounted across the elongate frame;
a lift arm comprising a first end and an opposite second end, wherein the first end of the lift arm is pivotably coupled to one end of the transverse support;
a leg extending below the debris hopper and disposed proximate the door, wherein the second end of the lift arm is pivotably coupled to one end of the leg opposite of the debris hopper;
a first fluid actuator extending between the transverse support and the lift arm;
a second fluid actuator extending between the lift arm and the leg;
wherein the second fluid actuator is coupled to the leg at a pivot point, and
wherein the pivot point is disposed between one end of the leg that is coupled to the debris hopper and the other end of the leg that is coupled to the lift arm.

2. The vehicle of claim 1, wherein the transverse support, the lift arm, the leg, the first fluid actuator, and the second fluid actuator are all aligned along a transverse plane and below the debris hopper.

3. The vehicle of claim 2, further comprising at least one water tank supported on the elongate frame and disposed between the front and rear lift assemblies.

4. The vehicle of claim 1, wherein the first fluid actuator and the second fluid actuator are coupled together in flow communication.

5. The vehicle of claim 1, further comprising a pressure sensor coupled to the transverse support and configured to monitor a pressure generated from the lift arm so as to determine a load weight held by the debris hopper.

6. The vehicle of claim 1, further comprising an angle sensor configured to monitor a leveling angle of the debris hopper.

7. A vehicle comprising:
an elongate frame extending between a front and a rear of the vehicle;
at least one lift assembly coupled to the elongate frame; and
a debris hopper supported by the at least one lift assembly and configured to lift and tilt relative to the elongate frame via the at least one lift assembly, wherein the debris hopper comprises:
a door rotatably coupled to the debris hopper and moveable between an open position and a closed position relative to the debris hopper;
a latch plate pivotably mounted to the door and moveable between a locked position and an unlocked position;
a fluid actuator coupled to the latch plate and configured to rotate the door;
a lock pin coupled to the debris hopper, wherein in the locked position, the latch plate is engaged with the lock pin to prevent the door from rotating towards the open position, and wherein the latch plate is pivoted to the unlocked position via the fluid actuator prior to the door rotating towards the open position.

8. The vehicle of claim 7, further comprising a chute rotatably coupled to the debris hopper and movable between an extended position and a retracted position, wherein the door is rotatably coupled to a top end of the debris hopper and the chute is rotatably coupled to a bottom end of the debris hopper.

9. The vehicle of claim 8, wherein the fluid actuator is coupled between the latch plate and the chute.

10. The vehicle of claim 9, wherein prior to the latch plate pivoting towards the unlocked position, the fluid actuator moves the chute into the extended position.

11. The vehicle of claim 9, wherein the chute is rotatably coupled to the debris hopper at a pivot point and the pivot point is offset from the fluid actuator coupling at the chute.

12. The vehicle of claim 7, further comprising one or more stops defined on the door that define the locked position and/or the unlocked position of the latch plate.

13. The vehicle of claim 7, wherein the latch plate is configured to remain in the locked position without a force generated from the fluid actuator.

14. A method of lifting and tilting a debris hopper on a vehicle, wherein the vehicle includes a frame and at least one lift and tilt assembly supporting the debris hopper on the frame, the method comprising:
lifting the debris hopper to a predetermined height via the at least one lift and tilt assembly, wherein the at least one lift and tilt assembly includes a lift arm having a first end pivotably coupled to the frame and a second end pivotably coupled to the debris hopper, a first fluid actuator coupled between the frame and the lift arm, and a second fluid actuator coupled between the lift arm and the debris hopper, and wherein during the lifting operation, the second fluid actuator maintains a horizontal level of the debris hopper;
extending a chute from the debris hopper;
tilting the debris hopper relative to the horizontal level, wherein during the tilting operation, the first fluid actuator synchronizes a height of the debris hopper to correspond to a position of the extended chute.

15. The method of claim 14, further comprising logging the horizontal level of the debris hopper prior to the tilting operation so that after the tilting operation the debris hopper returns to the logged horizontal level.

16. The method of claim 14, further comprising switching a directional fluid valve between the first fluid actuator and the second fluid actuator to change between the lifting operation and the tilting operation.

17. The method of claim 14, further comprising monitoring debris weight within the debris hopper based at least partially on pressure from the lift arm or forces within the first fluid actuator and the second fluid actuator.

18. A vehicle comprising:
an elongate frame extending between a front and a rear of the vehicle;
a debris hopper comprising a door disposed along a side of the vehicle; and
front and rear lift assemblies supporting the debris hopper on the elongate frame and configured to lift and tilt the debris hopper relative to the elongate frame, wherein each lift assembly comprises:
a transverse support mounted across the elongate frame;
a lift arm comprising a first end and an opposite second end, wherein the first end of the lift arm is pivotably coupled to one end of the transverse support;

a leg extending below the debris hopper and disposed proximate the door, wherein the second end of the lift arm is pivotably coupled to one end of the leg opposite of the debris hopper;

a first fluid actuator extending between the transverse support and the lift arm;

a second fluid actuator extending between the lift arm and the leg; and a bracket mounted to the lift arm between the first end and the second end, wherein both the first fluid actuator and the second fluid actuator are coupled to the bracket.

19. The vehicle of claim 18, wherein the second fluid actuator is coupled to the leg at a pivot point, and wherein the pivot point is disposed between one end of the leg that is coupled to the debris hopper and the other end of the leg that is coupled to the lift arm.

20. The vehicle of claim 18, wherein the transverse support, the lift arm, the leg, the first fluid actuator, and the second fluid actuator are all aligned along a transverse plane and below the debris hopper.

21. The vehicle of claim 18, wherein the first fluid actuator and the second fluid actuator are coupled together in flow communication.

22. A vehicle comprising:

an elongate frame extending between a front and a rear of the vehicle;

at least one lift assembly coupled to the elongate frame; and a debris hopper supported by the at least one lift assembly and configured to lift and tilt relative to the elongate frame via the at least one lift assembly, wherein the debris hopper comprises:
- a door rotatably coupled to the debris hopper and moveable between an open position and a closed position relative to the debris hopper;
- a latch plate pivotably mounted to the door and moveable between a locked position and an unlocked position;
- a fluid actuator coupled to the latch plate and configured to rotate the door, wherein the fluid actuator is coupled between the latch plate and the debris hopper;
- a lock pin coupled to the debris hopper, wherein in the locked position, the latch plate is engaged with the lock pin to prevent the door from rotating towards the open position, and wherein the latch plate is pivoted to the unlocked position via the fluid actuator prior to the door rotating towards the open position.

* * * * *